US005749606A

United States Patent [19]

Lu et al.

[11] Patent Number: 5,749,606

[45] Date of Patent: May 12, 1998

[54] CONNECTOR ASSEMBLY WITH RETAINER

[75] Inventors: Jian Gang Lu, Troy; Ronald Lee Beckmann, Rochester, both of Mich.

[73] Assignee: General Motors Corporation, Detroit, Mich.

[21] Appl. No.: 600,909

[22] Filed: Feb. 13, 1996

[51] Int. Cl.$^6$ ............................ F16L 37/088; F16L 55/00

[52] U.S. Cl. ............................ 285/86; 285/305; 285/315; 285/321

[58] Field of Search .................................... 285/305, 308, 285/315, 316, 317, 321, 81, 84, 86, 921

[56] References Cited

U.S. PATENT DOCUMENTS

| | | | |
|---|---|---|---|
| 2,784,987 | 3/1957 | Corcoran | 285/315 X |
| 3,030,129 | 4/1962 | Appleton . | |
| 3,207,535 | 9/1965 | Wilson . | |
| 3,227,803 | 1/1966 | Gohs . | |
| 3,326,580 | 6/1967 | Munier et al. . | |
| 3,380,505 | 4/1968 | Heath . | |
| 3,428,340 | 2/1969 | Pelton | 285/308 X |
| 3,574,359 | 4/1971 | Klein . | |
| 3,751,076 | 8/1973 | Thais et al. . | |
| 3,922,011 | 11/1975 | Walters | 285/321 X |
| 4,225,162 | 9/1980 | Dola . | |
| 4,240,654 | 12/1980 | Gladieux . | |
| 4,288,112 | 9/1981 | Stoll . | |
| 4,288,113 | 9/1981 | Saulnier . | |
| 4,538,679 | 9/1985 | Hoskins et al. . | |
| 4,557,508 | 12/1985 | Walker . | |
| 4,565,392 | 1/1986 | Vyse . | |
| 4,607,867 | 8/1986 | Jansen . | |
| 4,635,973 | 1/1987 | Sauer . | |
| 4,640,534 | 2/1987 | Hoskins et al. . | |
| 4,699,403 | 10/1987 | Wong . | |
| 4,700,926 | 10/1987 | Hansen . | |
| 4,749,192 | 6/1988 | Howeth | 285/305 X |
| 4,793,637 | 12/1988 | Laipply et al. . | |
| 4,819,968 | 4/1989 | Abe . | |
| 4,850,622 | 7/1989 | Suzuki . | |
| 4,867,483 | 9/1989 | Witt et al. . | |
| 4,872,710 | 10/1989 | Konecny et al. . | |
| 4,878,695 | 11/1989 | Whitham . | |
| 5,211,427 | 5/1993 | Washizu . | |
| 5,215,336 | 6/1993 | Worthing . | |
| 5,226,679 | 7/1993 | Klinger . | |
| 5,265,917 | 11/1993 | Hitz . | |
| 5,280,967 | 1/1994 | Varrin, Jr. . | |
| 5,343,892 | 9/1994 | Saito | 285/316 X |
| 5,360,237 | 11/1994 | Carman et al. . | |
| 5,429,396 | 7/1995 | Guest . | |

*Primary Examiner*—Terry Lee Melius
*Assistant Examiner*—Heather Shackelford
*Attorney, Agent, or Firm*—Kathryn A. Marra

[57] ABSTRACT

A connector assembly includes a female member having a bore extending therethrough and a male member for insertion into the bore of the female member. The male member has a shoulder portion thereon. A resilient member is disposed on the female member and extends partially into the bore. The resilient member engages the shoulder portion of the male member to lock the male member in position within the female member. In addition, a retainer is provided for coaxial connection to the female member. The retainer has an internal retainer groove axially aligned for receiving the resilient member therein when the retainer is coaxially connected to the female member. Thus, the resilient member is captured in the retainer groove between the retainer and the female member when the retainer is coaxially connected to the female member.

19 Claims, 2 Drawing Sheets

10 12 40 75 82 74 70 60 62 23 26 54 79 61 44 42 24 77 20 84 88,90 30 25 27 21 61 28 72 50 52 48 82 46

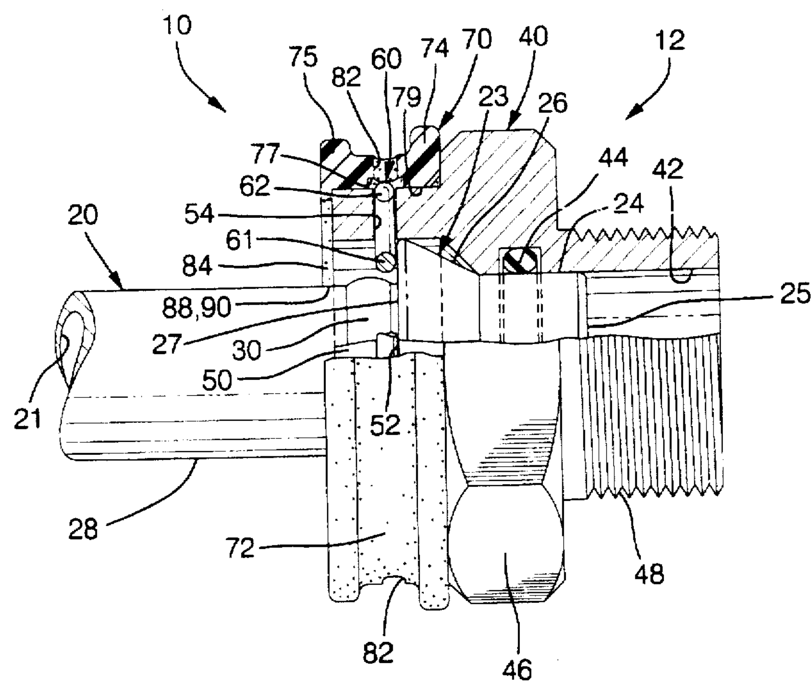
FIG. 1C
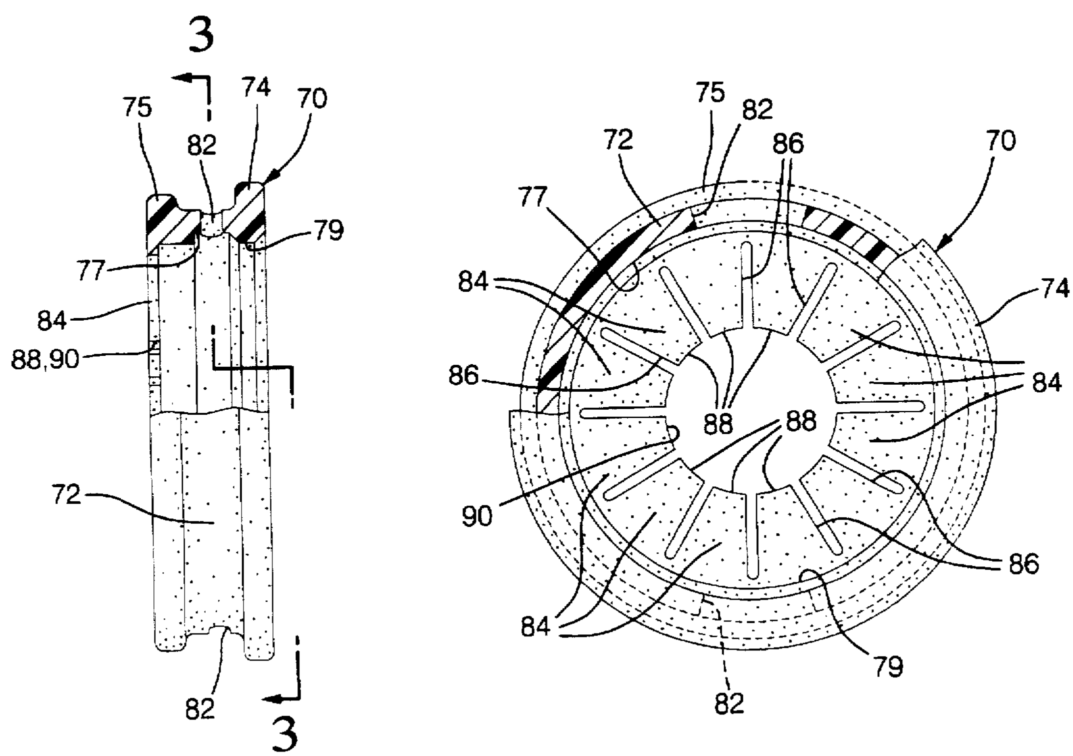
FIG. 2
FIG. 3

CONNECTOR ASSEMBLY WITH RETAINER

The present invention relates to a fluid connector assembly for use in a vehicle.

BACKGROUND OF THE INVENTION

It is well known in the prior art to provide a fluid connector assembly including a male member from which the fluid line extends and a female member connected to a receptacle for the fluid. For example, in the automotive industry, fluid lines are connected at one end to an automatic transmission and at another end to a cooler disposed within the header of a radiator. It is also known to provide a resilient member carried on the female member adapted to snap beneath a shoulder portion of the male member when inserted into the female member to lock the male member in place. The male member may be removed from the female member by expansion of the resilient member with the use of a simple tool, such as a screwdriver. The area of access to the connector assembly for assembly and disassembly is typically limited.

SUMMARY OF THE INVENTION

The present invention provides a connector assembly which includes an additional retainer that snaps onto the female member and captures the resilient member between the retainer and the female member. The retainer is lightweight, compact, easily assembled without the use of tools and easily disassembled from the connector assembly by the use of a simple tool, such as a screwdriver.

These advantages are accomplished in the present invention by providing a connector assembly including a female member having a bore extending therethrough and a male member for insertion into the bore of the female member. The male member has a shoulder portion thereon. A resilient member is disposed on the female member and extends partially into the bore. The resilient member engages the shoulder portion of the male member to lock the male member in position within the female member. In addition, a retainer is provided for coaxial connection to the female member. The retainer has an internal retainer groove axially aligned for receiving the resilient member therein when the retainer is coaxially connected to the female member. Thus, the resilient member is captured in the retainer groove between the retainer and the female member when the retainer is coaxially connected to the female member.

According to another preferred form of the invention, the female member includes a radially outwardly projecting portion and the retainer abuts the radially outwardly projecting portion when the retainer groove is axially aligned with the resilient member upon connection of the retainer to the female member. The retainer preferably includes a body portion on which the retainer groove is disposed and the body portion has enlarged radially outwardly extending flanges each extending from opposing axial sides of the retainer.

According to other preferred aspects of the invention, the retainer is rotatable relative to the female member, the resilient member, and the male member. The retainer may also include at least one slot therethrough which is axially aligned with the retainer groove to permit visual inspection of the resilient member when positioned within the retainer groove. Also preferably, the retainer includes a plurality of radially inwardly projecting flexible ear portions for engagement with the male member to coaxially position the retainer relative the male member prior to connection of the retainer to the female member.

BRIEF DESCRIPTION OF THE DRAWINGS

The present invention will now be described, by way of example, with reference to the accompanying drawings, in which;

FIG. 1C is a view similar to FIG. 1A, but showing the connector assembly in a final assembled condition with the retainer assembled to the female member;

FIG. 2 is a side view of the retainer partially-broken-away; and

FIG. 3 is a plan view of the retainer partially-broken-away as viewed along line 3—3 of FIG. 2.

DESCRIPTION OF THE PREFERRED EMBODIMENT

Figure 1A:
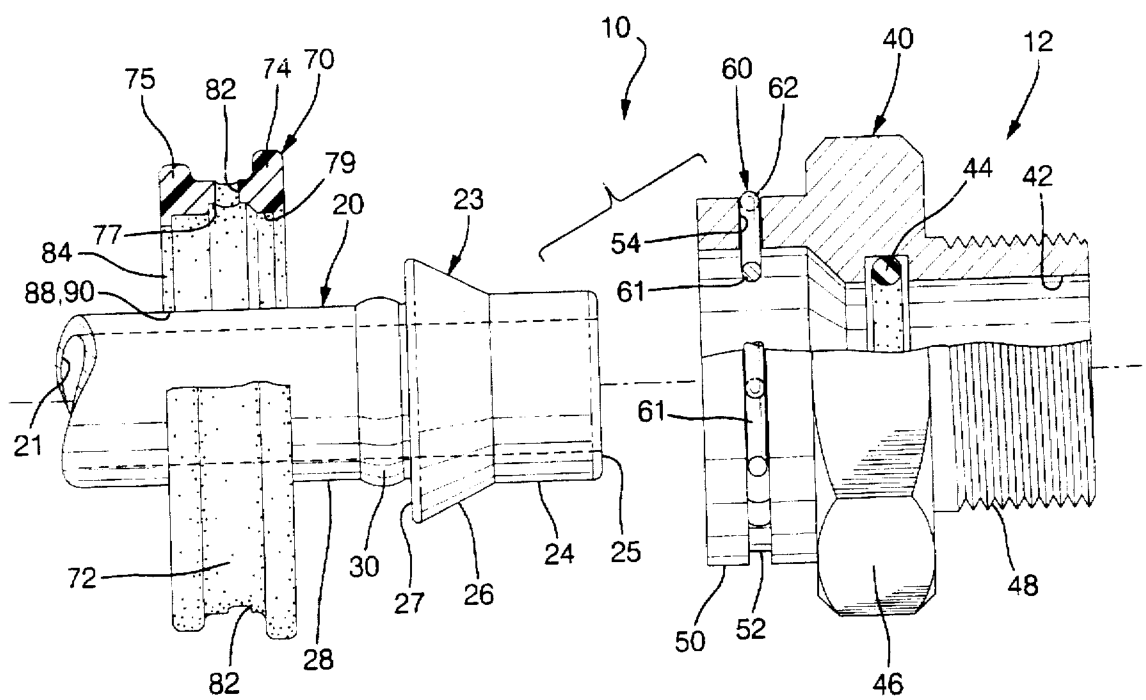
FIG. 1A is a partially exploded view of a connector assembly prior to insertion of a male member within a female member with the female member and a retainer shown partially-broken-away.

A fluid connector assembly, indicated generally as 10, can be used to connect a fluid line to a threaded port in a vehicle structure (not shown), such as an automatic transmission or a radiator. The connector assembly 10 preferably includes four components, a male member 20, a female member 40 for threaded connection to the port, a resilient member 60 disposed on the female member 40, and a retainer 70 for snap-fitted attachment to the female member 40.

Figure 1B:
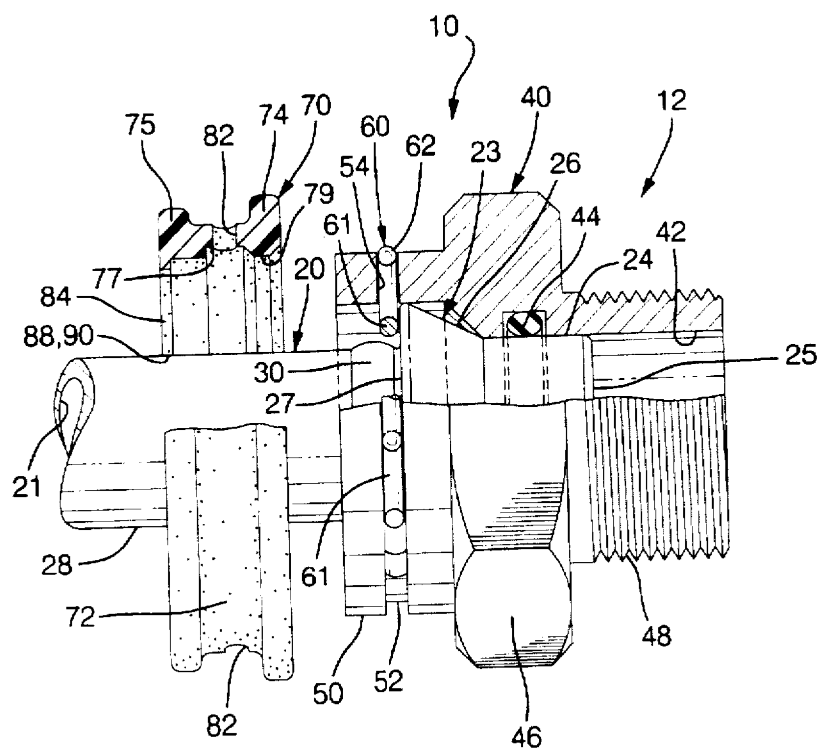
FIG. 1B is a view similar to FIG. 1A, but with the male member inserted into the female member.

As best shown in FIG. 1A, the male member 20 is preferably made of a metallic material and has a male member bore 21 extending entirely therethrough. The male member 20 includes a head portion 23 including a straight portion 24 terminating in a free end 25 of the head portion 23 and a radially outwardly tapered portion 26. The tapered portion 26 gradually increases in a direction away from the free end 25 and terminates in a shoulder portion 27 connected to a reduced diameter portion 28 of the male member 20. The reduced diameter portion 28 of the male member 20 preferably is an elongated fluid line having a generally constant diameter and which is preferably integrally formed with the head portion 23, but which may be also suitably connected thereto in a conventional manner. Preferably, an insertion indicator feature 30 is located on the reduced diameter portion 28 of the male member 20 adjacent the shoulder portion 27. The insertion indicator feature 30 preferably is a radially raised portion which may also be painted or otherwise colored (not shown) for visual and tactile distinction from the rest of the reduced diameter portion 28 of the male member 20. When the male member 20 is inserted into the female member 40 as shown in FIGS. 1B and 1C, the insertion indicator feature 30 is positioned within the female member 40 and cannot be detected upon inspection.

The female member 40 is preferably integrally made from a single piece of metallic material and has a female member bore 42 extending entirely therethrough. An O-ring 44 may be provided in the female member bore 42 to prevent fluid leakage after assembly of the male member 20 therein. The exterior body of the female member 40 has a central enlarged hexagonal outwardly projecting portion 46 disposed between a reduced diameter threaded portion 48 and a reduced diameter receiving portion 50. The threaded portion 48 can be threaded into the threaded port of the structure simply by turning the hexagonal outwardly projecting portion 46 until a fluid tight seal has been accomplished. A sealing compound (not shown) may be disposed on the threaded portion 48 to assist in maintaining a fluid tight seal. The receiving portion 50 of the female member 40 is preferably externally sized slightly larger than the threaded portion 48, but smaller than the outwardly projecting portion 46. The receiving portion 50 of the female member 40 preferably has a generally constant outer diameter. The receiving portion 50 of the female member 40 includes a receiving groove 52 thereon which is axially spaced apart from the outwardly projecting portion 46. The receiving groove 52 of the female member 40 is provided with circumferentially spaced apart slotted apertures 54 which extend between the receiving groove 52 and into the female member bore 42.

The resilient member 60 is preferably formed of a single piece of spring wire. The resilient member 60 is preferably formed with inwardly extending lobes 61 interconnected by outer portions 62. It will be appreciated that many variations of the resilient member 60 are possible and that more than one resilient member may be provided. To assemble the resilient member 60 to the female member 40, the resilient member 60 is snapped into the receiving groove 52 from the exterior side of the female member 40. In the assembled condition, the resilient member 60 is disposed on the receiving portion 50 and the lobes 61 of the resilient member 60 each extend through the slotted apertures 54. The lobes 61 are adapted to engage the shoulder portion 27 of the head portion 23 to hold the male member 20 within the female member 40 after insertion therein, as described further hereinafter. When the resilient member 60 is seated in the receiving groove 52 of the female member 40, the resilient member 60 is preferably in a relaxed condition, neither expanded or compressed. Also preferably when the resilient member 60 is seated in the receiving groove 52, the resilient member 60 is sized to have an overall dimension approximately equal to or slightly greater than the outer diameter of the receiving portion 50 of the female member 40.

The retainer 70 is preferably integrally formed of a single material. Preferably, the retainer 70 is integrally molded from a plastic material. The retainer 70 includes a central body portion 72 having an exterior surface with a reduced outer diameter. The central body portion 72 is axially positioned between first and second flanges 74, 75 having externally enlarged outer diameters in comparison to the central body portion 72. The flanges 74, 75 are preferably of unequal sizes, such as the first flange 74 is slightly larger than the second flange 75 as shown in the preferred embodiment, to make the retainer 70 easy to grip during assembly and disassembly.

The central body portion 72 includes an internal retainer groove 77 sized for receiving the resilient member 60 therein when the resilient member 60 is in the relaxed condition. The retainer 70 has a main inner diameter 79 defined by the radially inward edge of the first flange 74. The main inner diameter 79 is sized slightly smaller than the resilient member 60 in the relaxed condition for compression of the resilient member 60 during assembly, as described further hereinafter. The retainer 70 is axially dimensioned such that the retainer groove 77 is axially aligned with the resilient member 60 when the retainer 70 abuts the outwardly projecting portion 46 of the female member 40 after assembly of the retainer 70 onto the female member 40. Preferably, the central body portion 72 of the retainer 70 includes a plurality of circumferentially spaced apart slots 82 which are axially aligned with the retainer groove 77. These slots 82 permit visual inspection of the retainer groove 77 so that the resilient member 60 can be viewed during completed assembly of the connector assembly 10. It will be appreciated that the main inner diameter 79 of the retainer 70 is sized approximately equal to or only slightly larger than the outer diameter of the receiving portion 50 of the female member 40. Thus, when the retainer 70 is assembled to the female member 40, the retainer 70 can be rotated relative the female member 40 so that the slots 82 can be manually moved during inspection of retainer groove 77 and the resilient member 60 therein.

Preferably, the retainer 70 includes a plurality of integrally formed, radially inwardly projecting ear portions 84. The ear portions 84 are preferably relatively thin and planar in the radial direction. The ear portions 84 preferably include slits 86 therebetween to permit flexibility of the ear portions 84 during assembly. Inner radial edges 88 of the ear portions 84 preferably cooperatively define an opening 90 sized approximately equal to or slightly less than an outer diameter of the reduced diameter portion 28 of the male member 20 so that the ear portions 84 coaxially position the retainer 70 relative the male member 20 during assembly by an interference-fitted connection, as described further below.

The connector assembly 10 is assembled as follows. To assemble the resilient member 60 to the female member 40, the resilient member 60 is radially snapped into the receiving groove 52 from the exterior side of the female member 40 to form a female subassembly 12 shown in FIG. 1A. In the assembled condition, the resilient member 60 is disposed on the receiving groove 52 with the lobes 61 of the resilient member 60 each extending through the slotted apertures 54 into the female member bore 42 and with the outer portions 62 positioned on the exterior surface of the receiving groove 52 of the female member 40. The resilient member 60 as seated in the receiving groove 52 of the female member 40, is preferably in a relaxed condition, neither expanded or compressed. The female subassembly 12 is screwed into the threaded port of the structure, as described above.

Prior to insertion of the male member 20, the retainer 70 is preferably disposed on the reduced diameter portion 28 of the male member 20 and held coaxially in position thereon by the slight interference fit of the flexible ear portions 84. Advantageously, the flexible ear portions 84 permit the retainer 70 to be axially pushed over the male member 20 from either end. For example, the entire head portion 23 of the male member 20 can be pushed through the opening 90 formed by the flexible ear portions 84 until the retainer 70 is coaxially positioned on the reduced diameter portion 28 of the male member 20 at a location axially spaced apart from the tapered portion 26. Thus, the retainer 70 is then advantageously held in position as shown in FIG. 1 on the male member 20 until later assembly onto the female member 40.

Referring to FIGS. 1A and 1B, the head portion 23 of the male member 20 with the free end 25 leading is then axially inserted into the female member bore 42 of the receiving portion 50 of the female member 40. The resilient member 60 expands as it rides along the tapered portion 26 and then snaps into place beneath the shoulder portion 27 of the head portion 23. FIG. 1B shows the male member 20 completely inserted into the female member 40 such that the resilient member 60 is snapped in place beneath the shoulder portion 27 of the male member 20 to securely hold the male member 20 in position relative the female member 40. When the male member 20 is assembled to the female member 40, the resilient member 60 is in a relaxed condition and is seated substantially within the receiving groove 52 of the female member 40 as shown in FIG. 1B. Also shown in FIG. 1B, the insertion indicator feature 30 cannot be felt or seen since it is positioned within the female member bore 42.

As a final assembly step, the retainer 70 is simply axially pushed onto the receiving portion 50 of the female member 40 until the retainer groove 77 of the retainer 70 is axially aligned with the resilient member 60 for snap-fitted engagement of the resilient member 60 in the retainer groove 77. It will be appreciated that the retainer 70 may be assembled without the use of any tools. It will further be appreciated that the retainer 70 cannot be snapped onto the female member 40 until the male member 20 is fully inserted into the female member 40 with the resilient member 60 snapped in place beneath the shoulder portion 27 of the male member 20. If the resilient member 60 is not snapped beneath the shoulder portion 27 of the male member 20, then the resilient member 60 engages the tapered portion 26 and is in an expanded condition and the retainer 70 cannot be snapped in place. In the assembled condition shown in FIG. 1C, the resilient member 60 is captured between the retainer 70 and the female member 40. However, it will be appreciated that the resilient member 60 securely holds the male member 20 within the female member 40 regardless of the presence of the retainer 70. In the final assembled condition, the retainer 70 closely abuts the outwardly projecting portion 46 of the female member 40 such that there is very little or no gap between the retainer 70 and the outwardly projecting portion 46 to verify that assembly has been completed. It will be appreciated that the retainer 70 made of a molded plastic material is lightweight and takes relatively little space in the assembly.

The connector assembly 10 can be easily disassembled as follows. The retainer 70 can be snapped off the female member 40 by the use of a simple tool, such as a screwdriver. Next, the resilient member 60 can be radially expanded and removed from the female member 40 by the use of a simple tool, such as a screwdriver. Finally, the male member 20 can simply be axially pulled out of the female member 40.

It will be understood that a person skilled in the art may make modifications to the specific embodiment shown herein within the scope and spirit of the claims.

While the present invention has been described as carried out in a specific embodiment thereof, it is not intended to be limited thereby, but is intended to cover the invention broadly within the scope and spirit of the appended claims.

What is claimed is:

1. A connector assembly comprising:

a female member having an axial bore extending therethrough;

a male member for axial insertion into the bore of the female member, the male member having a tapered portion terminating in a shoulder portion, the male member having an axial axis including an axial length;

a resilient member disposed on the female member and extending partially into the bore, the resilient member for axially sliding over the tapered portion and engaging the shoulder portion of the male member to lock the male member in position within the female member when the male member is fully inserted into the female member, the resilient member having a relaxed condition when the male member is fully inserted into the female member and the resilient member engages the shoulder portion, the resilient member having a radially expanded condition when engaging the tapered portion when the male member is partially inserted into the female portion;

a retainer initially mounted on the male member and slidable from the male member onto the female member upon full insertion of the male member into the female member, the retainer having an internal retainer groove being axially alignable along the length of the axis for receiving the resilient member therein when the male member is fully inserted in the female member and the retainer is coaxially connected to the female member, the internal retainer groove being axially misaligned along the length of the axis with the resilient member when the resilient member engages the tapered portion and is in the expanded condition when the male member is partially inserted into the female member, the tapered portion being shaped and sized for radially enlarging the resilient member larger than the retainer when the resilient member engages the tapered portion, such that when the resilient member is in the relaxed condition and engages the shoulder portion of the male member, the retainer groove is axially alignable along the length of the axis with the resilient member for snap-fitted engagement of the resilient member into the retainer groove indicating that the male member is fully inserted in the female member and such that when the resilient member is in the expanded condition and engages the tapered portion of the male member, the retainer groove is axially misaligned along the length of the axis with the resilient member and the resilient member is disengaged from the retainer groove thereby indicating that the male member is partially inserted in the female member.

2. The connector assembly of claim 1 wherein the female member includes a radially outwardly projecting portion and wherein the retainer abuts the radially outwardly projecting portion when the retainer groove is axially aligned along the length of the axis with the resilient member upon connection of the retainer to the female member.

3. The connector assembly of claim 1 wherein the female member includes a radially outwardly projecting portion and wherein the retainer is axially dimensioned such that the retainer abuts the outwardly projecting portion of the female member when the retainer groove is axially aligned along the length of the axis with the resilient member and such that the retainer is spaced from the outwardly projecting portion of the female member when the retainer groove is axially misaligned along the length of the axis with the resilient member.

4. The connector assembly of claim 1 wherein the retainer includes a body portion on which the retainer groove is disposed, the body portion having opposing axial sides and wherein the retainer includes enlarged radially outwardly extending flanges each extending from the opposing axial sides of the retainer.

5. The connector assembly of claim 4 wherein one of the outwardly extending flanges is sized larger than the other of the outwardly extending flanges.

6. The connector assembly of claim 1 wherein the retainer is rotatable relative to the female member, the resilient member, and the male member.

7. The connector assembly of claim 1 wherein the retainer includes at least one slot therethrough which is axially and radially aligned with the retainer groove to permit visual inspection of the resilient member when positioned within the retainer groove.

8. The connector assembly of claim 1 wherein the retainer includes a plurality of circumferentially spaced apart slots axially and radially aligned with the retainer groove.

9. The connector assembly of claim 1 wherein the retainer is integrally formed of a single material.

10. The connector assembly of claim 1 wherein the retainer is integrally molded from a plastic material.

11. A connector assembly comprising:

a female member having a bore extending therethrough;

a male member for insertion into the bore of the female member, the male member having a shoulder portion thereon;

a resilient member disposed on the female member and extending partially into the bore, the resilient member engaging the shoulder portion of the male member to lock the male member in position within the female member;

a retainer for coaxial connection to the female member, the retainer having an internal retainer groove axially aligned for receiving the resilient member therein when the retainer is coaxially connected to the female member whereby the resilient member is captured in the retainer groove between the retainer and the female member when the retainer is coaxially connected to the female member;

the male member including a reduced diameter portion and the retainer including a plurality of radially inwardly projecting ear portions for engagement with the reduced diameter portion of the male member to coaxially position the retainer relative to the male member prior to connection of the retainer to the female member.

12. The connector assembly of claim 11 wherein the ear portions include a plurality of slots therebetween to permit flexibility of the ear portions during assembly.

13. The connector assembly of claim 11 wherein the ear portions are planar in a radial direction.

14. The connector assembly of claim 11 wherein ear portions include inner radial edges defining an opening sized slightly smaller than the reduced diameter portion of the male member for an interference connection therewith.

15. A method of assembling a connector assembly including a male member secured to a fluid line and having an axially extending tapered portion terminating at a shoulder portion, the male member having an axial axis including an axial length, a female member including a bore therethrough for receiving the male member therein, and a resilient member disposed on the female member and extending partially into the bore, the method comprising the steps of:

providing a retainer having an internal retainer groove thereon;

coaxially connecting the retainer to the male member;

axially inserting the male member into the female member by radial expansion of the resilient member by the tapered portion of the male member while keeping the retainer completely spaced apart from the female member and completely out of engagement with the female member, the resilient member, and the shoulder portion of the male member; and axially sliding the retainer disposed on the male member along the length of the male member from the male member onto the female member after insertion of the male member into the female member such that when the resilient member is in a relaxed condition and engages the shoulder portion of the male member, the retainer groove becomes axially aligned along the length of the axis with the resilient member for snap-fitted engagement of the resilient member into the retainer groove for indicating that the male member is fully inserted into the female member and such that when the resilient member is in a radially expanded condition and engages the tapered portion of the male member, the retainer groove is prevented from axial alignment along the length of the axis with the resilient member and the resilient member does not engage the retainer groove indicating that the male member is partially inserted into the female member.

16. The method of claim 15 further comprising the steps of axially sliding the retainer along the length of the axis and away from and out of contact with the female member and the resilient member when the resilient member is in the radially expanded condition and still engages the tapered portion of the male member such that the retainer groove is axially misaligned along the length of the axis with the resilient member and the resilient member does not engage the retainer groove, and then further axially inserting the male member into the female member, and then repeating the step of axially sliding the retainer onto the female member and over the resilient member until the retainer groove is axially aligned along the length of the axis with the resilient member for snap-fitted engagement therewith to indicate that the male member is fully inserted into the female member.

17. A method of assembling a connector assembly including a male member secured to a fluid line and having a shoulder portion thereon, the male member having an axial axis including an axial length, a female member including a bore therethrough for receiving the male member therein, and a resilient member disposed on the female member and extending partially into the bore, the method comprising the steps of:

providing a retainer having an internal retainer groove thereon;

coaxially connecting the retainer to the male member;

axially inserting the male member into the female member by radial expansion of the resilient member by a tapered portion of the male member until the resilient member snap-fittedly engages the shoulder portion of the male member to securely connect the male member to the female member;

axially pushing the retainer disposed on the male member from the male member onto the female member and over the resilient member until the retainer groove is axially aligned along the length of the axis with the resilient member for snap-fitted engagement therewith; and subsequent to connection of the male member into the female member, axially pushing the retainer onto the female member until the retainer engages the resilient member in the retainer groove and simultaneously abuts an outwardly projecting portion of the female member.

18. The method of claim 17 further comprising the steps of providing the retainer with slots axially and radially aligned with the retainer groove and inspecting the resilient member by rotation of the retainer.

19. A method of assembling a connector assembly including a male member secured to a fluid line and having a shoulder portion thereon, the male member including an axial axis having an axial length, a female member including a bore therethrough for receiving the male member therein, and a resilient member disposed on the female member and extending partially into the bore, the method comprising the steps of:

providing a retainer having an internal retainer groove thereon;

coaxially connecting the retainer to the male member;

axially inserting the male member into the female member by radial expansion of the resilient member by a tapered portion of the male member until the resilient member snap-fittedly engages the shoulder portion of the male member to securely connect the male member to the female member;

axially pushing the retainer disposed on the male member from the male member onto the female member and over the resilient member until the retainer groove is axially aligned along the length of the axis with the resilient member for snap-fitted engagement therewith;

providing the retainer with inwardly projecting flexible ear portions defining an opening and coaxially positioning the retainer on the male member prior to connection to the female member by axially inserting the tapered portion of the male member through the opening and past the opening until the ear portions flexibly engage a reduced diameter portion of the male member at a location axially spaced apart from the tapered portion.

* * * * *